Sept. 14, 1926.
J. H. WOODARD
1,599,606
COFFEE BOILER
Filed Nov. 23, 1925
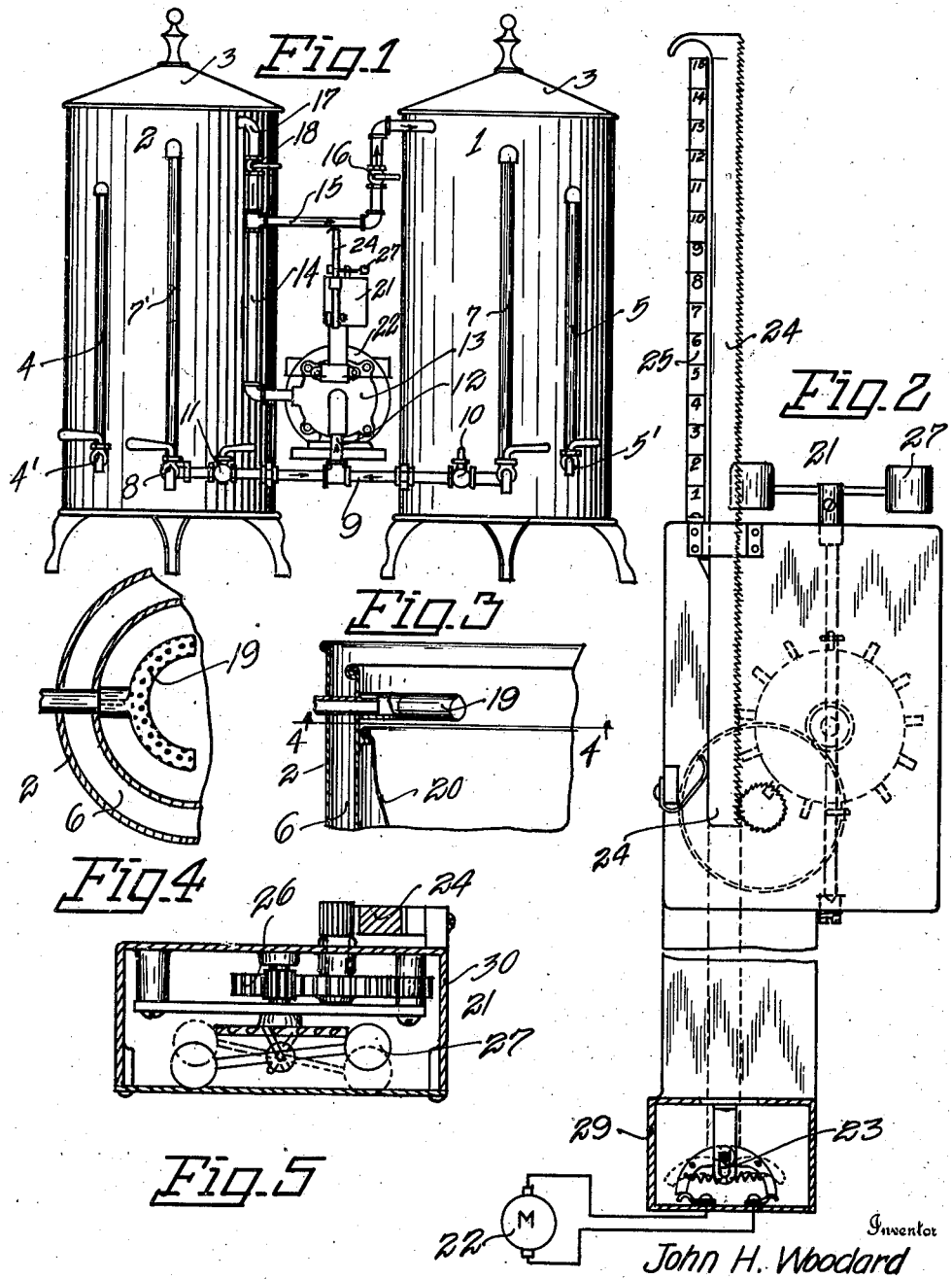
Inventor
John H. Woodard
By Herbert E. Smith
Attorney Patented Sept. 14, 1926.

1,599,606

UNITED STATES PATENT OFFICE.

JOHN H. WOODARD, OF SPOKANE, WASHINGTON.

COFFEE BOILER.

Application filed November 23, 1925. Serial No. 70,854.

My present invention relates to improvements in coffee urns of the type used in restaurants, dining rooms, lunch rooms and other similar places where large quantities of coffee are prepared and dispensed. The customary practice in such places is to utilize one or more urns each having a water jacket for hot water, and to transfer the hot water from the jacket to the coffee compartment by the use of a pitcher, bucket, or other convenient vessel. By thus manually transferring the water it is poured over the ground coffee contained in a coffee bag, and the water passes through the coffee in such large quantities and so rapidly that efficient extraction of the essence from the coffee is impossible. The services of an attendant are also required for this purpose at the expense of time and labor. By the utilization of my invention means are provided in connection with one or a plurality of coffee urns whereby the water may automatically be supplied to the coffee in regulated quantities and the water is permitted to pass slowly through the coffee for the extraction of its essence. In this manner manual labor, attention of the coffee dispenser, and loss of time are eliminated.

In accomplishing the objects of my invention I preferably utilize a pair of urns, one of which may be used for dispensing coffee while the other may be used in the preparation of a supply for subsequent use. A heating device is employed for each urn and a circulating pump for water is interposed between the urns and connected with the water outlet pipes and to the coffee compartments of the urns for periodically supplying water to the coffee.

The pump is operated by an electrically controlled motor and a time controlled mechanism is employed for predetermining the operation of the motor and the consequent supply of water to the coffee.

My invention consists in certain novel combinations and arrangements of parts as will hereinafter be more fully set forth and claimed. In the accompanying drawings I have illustrated one complete example of the physical embodiment of my invention wherein the parts are combined and arranged according to the best mode I have thus far devised for the practical application of the principles of my invention.

Figure 1 is a view in elevation of a pair of coffee urns equipped with the apparatus of my invention.

Figure 2 is an enlarged view of a time controlled electrical switch controlling mechanism for the motor and its pump.

Figure 3 is a detail sectional view at the top of an urn showing a water distributer therein.

Figure 4 is a detail sectional view at line 4—4 of Fig. 3.

Figure 5 is a horizontal sectional view showing operating parts of the time controlled mechanism.

In carrying out my invention I preferably use a pair of urns 1 and 2 having removable lids 3 and water outlet pipes 4 and 5 with faucets 4' and 5' as usual, and any well known means are employed for heating the contents of the urn. Each coffee urn is fashioned with a water jacket 6 from which water may be drawn through outlet pipes 7 and 7' controlled by the faucets 8 and 8'. These outlet pipes are connected by a horizontal pipe 9 located near the bottoms of the urns and said pipe has interposed therein a pair of cut off valves 10 and 11. Between these cut off valves is connected an intake pipe 12 to a rotary pump 13, which pump is provided with a single discharge pipe 14 having a branch pipe 15 with a cut off valve 16 for controlling inlet of water to one urn, and a branch pipe 17 and valve 18 for controlling inlet of water to the other urn.

The inlet pipes 16 and 17 to the respective urns are each fashioned with a horizontally disposed, perforated tubular ring or spray nozzle 19 located at the end of the pipe and supported in the top of the coffee compartment of the urn. These spray nozzles are designed to distribute water to the contents of the usual coffee bag 20 which is suspended in suitable manner near the top of the urn below the distributing ring. By means of the spraying nozzles the water is uniformly distributed or sprinkled over the ground coffee in the bag 20 and the water slowly percolates through the contents of the bag for extraction of the essence from the coffee.

By the utilization and manipulation of the several valves between the urns the two urns may be used independently of each other as well as used in combination with each other for supplying water to the coffee.

By closing valves 11 and 18 and opening valves 10 and 16 with faucet 8' closed, the pump may be operated to withdraw water from the water jacket of urn 1 through pipes 7 and 9 to the discharge pipe 14, and thence through pipe 15 to the spraying nozzle 19 in urn 1. By opening and closing complementary valves at the left side of the pump in Fig. 1 water may be pumped to the spray nozzle 19 in the urn 2. By closing valves 10 and 18 with valves 11 and 16 open water may be taken from the jacket of urn 2 and supplied to the coffee in urn 1, and by proper manipulation of the valves the reverse of this operation may be accomplished. Various other combinations may be made in the circulation system if desired.

In Figure 1 a time controlled mechanism is indicated as a whole by the number 21 for use in connection with the electric motor 22 which operates the supply pump. In the detail view of the time controlling mechanism (Fig. 2) the electric switch 23 is normally held open by means of the weight of a rack bar 24 when the latter is in normal dotted position. The rack bar is used as a gravity-actuated device and may be elevated a distance corresponding to the designated time on the gage 25 with which it co-acts. As the elevated bar descends under action of gravity a clock-work mechanism 26 is actuated to retard its movement and gradually guide it to the switch device 23, a governor 27 being utilized to control the descent of the rack bar through the clock-work mechanism. When the rack bar contacts with the switch device 23 the power circuit for the motor is automatically broken and remains broken until the rack bar is again manually elevated. Suitable housings 29 and 30 are provided for the operating parts of the control mechanism and other features where necessary are used where required.

Having thus fully described my invention what I claim as new and desire to secure by Letters Patent is—

The combination with a pair of urns each having a water jacket, an outlet pipe, and a pipe connecting said outlet pipes, of spaced cut off valves in said connecting pipe and a circulating pump having an intake connected to said pipe, a discharge pipe from the pump having branches to said urns and cut off valves in said branches, means for actuating the pump and time controlled mechanism for said actuating means.

In testimony whereof I affix my signature.

JOHN H. WOODARD.